UNITED STATES PATENT OFFICE.

JOHN GAISSER, OF GLENDALE, NEW YORK.

MATERIAL SUITABLE FOR WALL-COVERINGS AND OTHER PURPOSES.

1,322,893.     Specification of Letters Patent.     Patented Nov. 25, 1919.

No Drawing.     Application filed April 8, 1918. Serial No. 227,352.

*To all whom it may concern:*

Be it known that I, JOHN GAISSER, a citizen of the United States, and a resident of Glendale, in the county of Queens and State of New York, have invented certain new and useful Material Suitable for Wall-Coverings and other Purposes, of which the following is a specification.

The object of my invention is to provide a material which may be used in place of plaster or tiles in covering or finishing walls and the same is useful wherever a hard, smooth-surface material is desired. The material may be applied directly over the laths of a wall in place of the ordinary wall plaster. It may be applied as a finishing covering to plaster board. It may be made in shapes to resemble tiles and applied the same as tiles or in any other manner. It may be applied to a wall and then marked with grooves before it has completely hardened, in order to make the finished covering resemble tiling. The material may be troweled, molded or cast in any desired shape and for various uses, and it may be applied and will set without the use of heat. It has a hard, smooth surface of fine texture and it is not easily fractured or chipped. The material may be made waterproof and it may have coloring matter incorporated therein or the surface may be painted after the material has set.

I shall state herein the materials used in making my new composition of matter and the proportions which I have found most satisfactory and economical without intending to limit myself to these proportions.

In making my new composition of matter I mix together ten parts of superfine or double calcined cement and four parts of hydrated lime. These in themselves will produce a very satisfactory product but I prefer to incorporate additional substances. To the above I add a hard, earthy substance to render the product hard and to improve the surface. For this purpose I mix with the cement and hydrated lime two parts of marble dust. This makes the product very hard, with a smooth, glossy surface.

If the product is to be waterproof I add to the above one part of commercial waterproofing material, which may consist of the commercial product known as "Medusa." Any of the other commercial waterproofing powders may be used instead of the one named.

To the above materials, properly mixed, I add sufficient water to give the proper consistency. If the product is to be applied as a wall covering it may be made quite thick whereas for other uses it may be made much thinner.

If the product is to be colored I prefer to mix with the powdered material before the water is added, mineral coloring matter free of oil. If desired, the material may be colored after it has set by painting the surface the same as with any other wall covering.

Having described my invention, what I claim is:

1. A plastic composition consisting of approximately ten parts of superfine cement, four parts hydrated lime, two parts marble dust, and water.

2. A plastic composition composed of approximately ten parts of superfine cement, four parts of hydrated lime, two parts of marble dust, one part waterproofing powder, and water.

Signed at the city, county and State of New York, this 25th day of March, 1918.

JOHN GAISSER.